United States Patent
Ellis et al.

(10) Patent No.: US 10,248,330 B2
(45) Date of Patent: Apr. 2, 2019

(54) DATA STORAGE DEVICE WITH BUFFER TENURE MANAGEMENT

(71) Applicant: Seagate Technology LLC, Cupertino, CA (US)

(72) Inventors: Jackson Ellis, Fort Collins, CO (US); Jeffrey Munsil, Fort Collins, CO (US); Timothy Canepa, Los Gatos, CA (US); Stephen Hanna, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/608,203

(22) Filed: May 30, 2017

(65) Prior Publication Data

US 2018/0349035 A1 Dec. 6, 2018

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ............................. G06F 3/0659; G06F 3/0679
See application file for complete search history.

(56) References Cited

U.S. PATENT DOCUMENTS

| | | | |
|---|---|---|---|
| 5,638,528 A | 6/1997 | Gay et al. | |
| 6,397,287 B1 | 5/2002 | Brown et al. | |
| 6,425,023 B1 | 7/2002 | Batchelor et al. | |
| 6,556,952 B1 | 4/2003 | Magro | |
| 7,447,805 B2 | 11/2008 | Braun et al. | |
| 7,584,308 B2 | 9/2009 | Gower et al. | |
| 7,818,497 B2 | 10/2010 | Gower et al. | |
| 7,921,243 B1 | 4/2011 | White | |
| 7,925,824 B2 | 4/2011 | Brittain et al. | |
| 8,949,500 B2 | 2/2015 | Byrne et al. | |
| 9,043,530 B1* | 5/2015 | Sundaram | G06F 3/068 711/100 |
| 2005/0041453 A1* | 2/2005 | Brazis | G11C 7/1006 365/63 |
| 2011/0161552 A1* | 6/2011 | Lund | G06F 12/0246 711/103 |
| 2012/0311000 A1* | 12/2012 | Post | G06F 12/02 707/824 |
| 2013/0086131 A1* | 4/2013 | Hunt | G06F 12/0276 707/819 |
| 2014/0189421 A1* | 7/2014 | Werner | G06F 11/2056 714/6.21 |
| 2017/0277432 A1* | 9/2017 | Yun | G06F 3/0679 |

* cited by examiner

*Primary Examiner* — Ryan Bertram
*Assistant Examiner* — Trang K Ta
(74) *Attorney, Agent, or Firm* — Hall Estill Attorneys at Law

(57) ABSTRACT

A data storage device with one or more buffers can employ buffer tenure management with at least a data storage device having a first buffer, a second buffer, a buffer manager, and a non-volatile memory. The first buffer can be located on-chip while the second buffer is located off-chip. The first buffer may be filled with data having a tenure of less than a predetermined tenure threshold as directed by the buffer manager.

19 Claims, 4 Drawing Sheets

US 10,248,330 B2

DATA STORAGE DEVICE WITH BUFFER TENURE MANAGEMENT

SUMMARY

A data storage device, in some embodiments, has a data storage device having a first buffer, a second buffer, a buffer manager, and a non-volatile memory. The first buffer is be located on-chip while the second buffer is located off-chip. The first buffer is filled with data having a tenure of less than a predetermined tenure threshold as directed by the buffer manager as part of buffer tenure management.

DETAILED DESCRIPTION

Assorted embodiments are generally directed to data storage systems with buffer management based on actual and/or predicted tenure of write data corresponding with a write request from a host.

As computing devices have become more prevalent and powerful, increased amounts of data is generated, transferred, and stored. A variety of different types of data memory has evolved to accommodate faster transfer of data to, and from, a data storage system. However, different types of data memory have different physical and performance characteristics that make it difficult to service a data storage system with a single type of data memory. As a result, bottlenecks and inefficiencies exist when managing the transfer and storage of data with multiple different types of data memory.

Accordingly, some embodiments provide a buffer manager that intelligently directs data between different types of data memory based on predicted and/or actual data tenure. The ability to selectively utilize multiple different types of data memory allows a data storage system to optimize data transfer and storage performance by taking advantage of the efficient characteristics of the respective types of memory.

Figure 1:
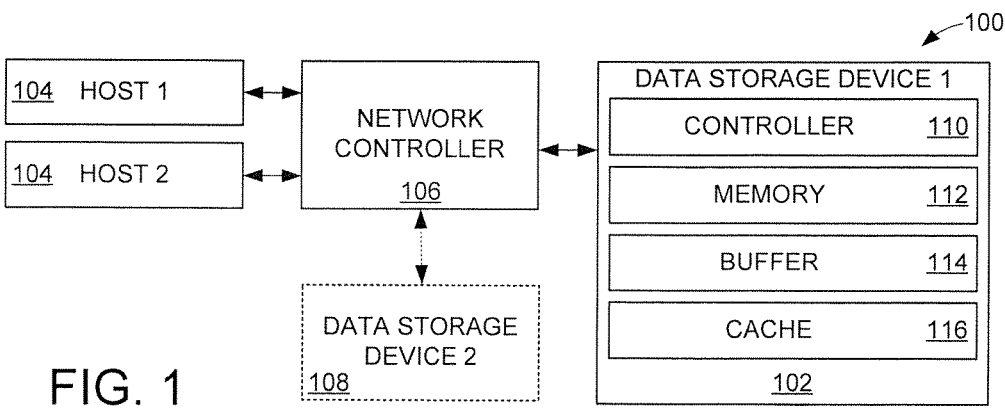
FIG. 1 is a block representation of an example data storage system arranged in accordance with various embodiments.

Turning to the drawings, FIG. 1 displays a block representation of an example data storage system 100 in which various embodiments can be practiced. The data storage system 100 can employ any number of data storage devices 102, which can be similar, or dissimilar, types of devices, such as solid-state, rotating magnetic, or hybrid drives. One or more hosts 104 can concurrently, sequentially, or selectively access a data storage device 102 via at least one network controller 106 connected via a wired and/or wireless network. It is noted that the network controller 106 may be a hardware implementation, such as a server or card, or a software implementation, such as a virtual machine.

As shown by segmented lines, a second data storage device 108 can be incorporated into the data storage system 100 to provide greater data capacity than a single data storage device 102. The addition of data storage device(s) 108 may further allow for increased data protection and security, such as with striping, mirroring, and storage of parity data as a redundant array of independent devices (RAID). While not required or limiting, a data storage device 102/108 can consist of a local controller 110, such as a microprocessor or programmable controller, a non-volatile memory 112, such as a solid-state type, at least one buffer 114, such as a volatile memory, and a cache 116, such as a volatile memory.

With multiple hosts 102 capable of accessing relatively large data capacity, large volumes of data can concurrently, and sequentially, be processed by the respective data storage devices 102/108, particularly in RAID system configurations. Such large volumes of data can experience performance bottlenecks when data assigned to the non-volatile memory 112 is being pending in a buffer 114 or cache 116 while being processed. That is, some non-volatile memories 112, like NAND flash, are not byte or bit addressable and cannot be written in-place, which creates inefficiencies in compiling data maps, map units of multiple data sectors, and garbage collecting portions of the memory 112.

Figure 2:
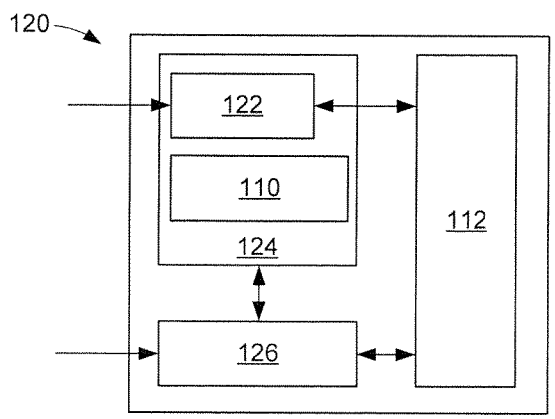
FIG. 2 displays a block representation of portions of an example data storage device capable of being used in the data storage system of FIG. 1.

FIG. 2 conveys a block representation of portions of an example data storage device 120 that may be employed in the data storage system 100 of FIG. 1. The data storage device 120 can comprise a first volatile buffer memory 122, such as static random access memory, resident in a wafer chip 124 along with a connected local controller 110. The physical construction of the first volatile buffer memory 122 in the silicon material of the wafer chip 124 can be characterized as "on-chip" while mere interconnection to the chip 124 via one or more interconnects, such as the second volatile buffer memory 126, can be characterized as "off-chip." In other words, creating aspects of the first volatile buffer memory 122 out of the silicon material of the wafer chip 124 means the memory 122 is on-chip and connection to the chip 124 without being constructed of the wafer material means the second memory 126 is off-chip.

The construction of the on-chip first volatile buffer memory 122 provides faster data transfer and lower data latency due, at least in part, to less interfaces and buffers along with decreased clock frequency limitations that inhibit the off-chip second volatile buffer memory 126. The faster capabilities of the on-chip first volatile buffer memory 122 is expensive in terms of available real estate on the wafer chip 124, which results in a smaller data capacity for the memory 122. Thus, the data storage device 120 employs both the first 122 and second 124 volatile buffer memories to temporarily store data associated with a data write request to the non-volatile memory 112.

In yet, buffer management has historically been rudimentary and only exacerbated performance bottlenecks associated with the writing of large volumes of data to the non-volatile memory 112. For instance, a first in, first out buffer management scheme can fill the faster first buffer memory 122 with data that takes a relatively long time to process and/or write to memory 112. As another example, sequentially writing data to the larger capacity second buffer memory 126 then to the faster first buffer memory 122 results in the latency of the second buffer memory 126 degrading the performance of write data that could be processed by the first buffer memory 122.

Figure 3:
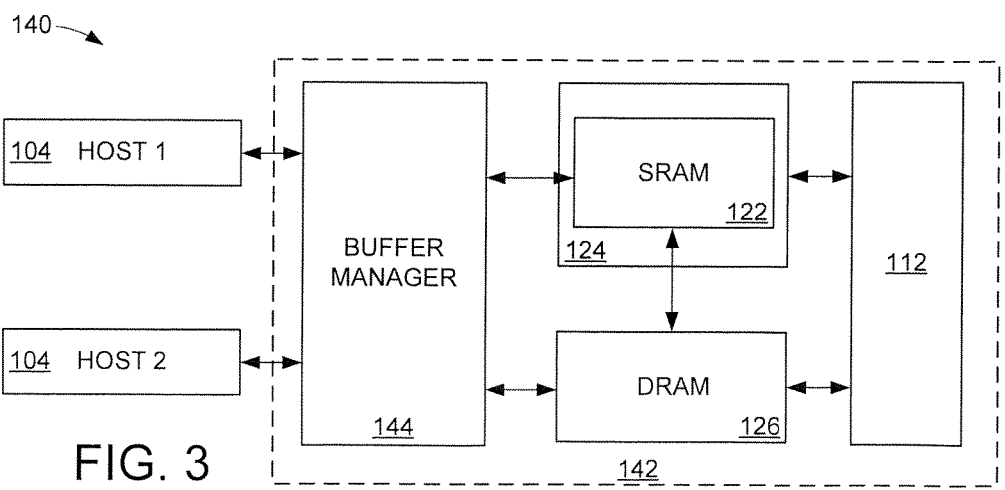
FIG. 3 shows a block representation of some of an example data storage system constructed and operated in accordance with some embodiments.

These issues, and others, have rendered various embodiments to provide a data storage system that intelligently manages multiple different types of buffers to service data associated with pending write requests. FIG. 3 illustrates a block representation of portions of an example data storage system 140 in which assorted embodiments of the present disclosure can be employed. The data storage system 140 has any number of local or remote hosts 104 communicating with a data storage device 142. Such communication can correspond with a network controller, switch, and other upstream network distribution hardware and/or software.

Instead of simply being stored in a buffer in accordance with static firmware code, a buffer manager 144 can provide adaptive intelligence that selects from an on-chip first buffer 122 and an off-chip second buffer 124 based on a generated actual and/or predicted tenure of the write data in the respective buffers 122/126. It is noted that "tenure" is to be understood as the time data associated with a write request remains in a buffer 122/126 regardless of the time to write to the non-volatile memory 112. That is, a data tenure may be characterized as the amount of time data remains in a buffer 122/126 before being deleted, such as via garbage collection long after the data is written to the non-volatile memory 112.

In accordance with some embodiments, the buffer manager 144 evaluates an incoming write request and generates a data tenure value that corresponds with a buffer 122/126 destination that optimizes data storage performance and least impacts the servicing of the data write request. Such intelligent evaluation can result in the buffer manager 144 directing data to, and between, the respective buffers 122/126 proactively and reactively to system 140 operating conditions.

Figure 4:
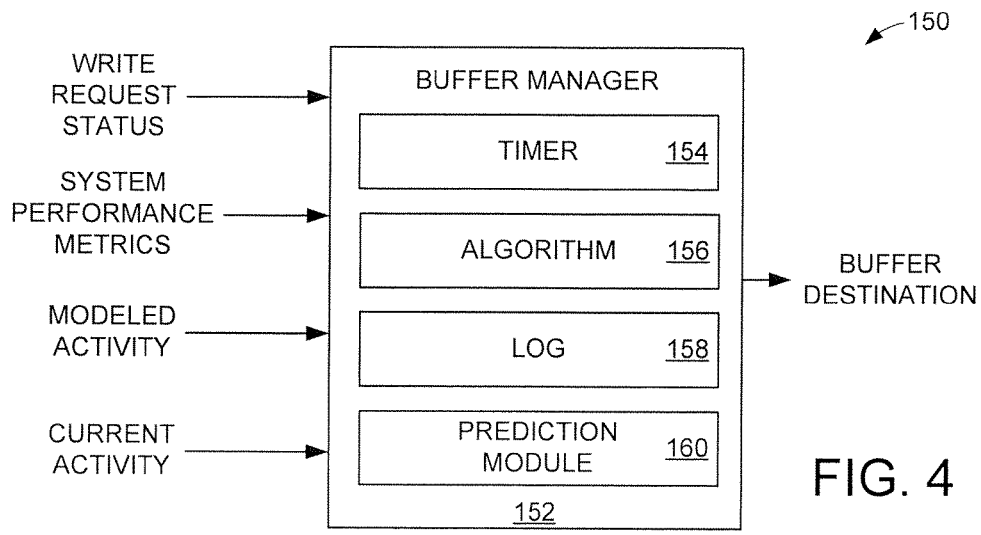
FIG. 4 depicts a block representation of a portion of an example data storage device utilized in the data storage system of FIG. 3.

FIG. 4 represents a portion of an example buffer system 150 that can be utilized in the data storage system 140 of FIG. 3. The buffer system 150 can be located within a housing of a data storage device 102/142 and it is contemplated that each data storage device of a data storage system 100/140 has a separate buffer manager 152 that consists of a timer 154, software algorithm 156, log 158, and prediction module 160. It is contemplated that multiple separate buffer managers 152 can utilize common system hardware and/or software with, or without, having the timer 154, algorithm 156, log 158, and prediction module 160 contained within a data storage device housing.

The buffer manager 152 can receive any number of system, write data, and model parameters from one or more sources inside, or external to, a data storage system. However, some embodiments sequentially, or concurrently, receive information relating to pending write requests, system performance metrics, modeled system activity, and current system activity The pending write request information may involve volume, location, span, assigned logical block address (LBA), and assigned physical block address (PBA). System performance metrics may consist of system latency, error rate, buffer available capacity, non-volatile memory available capacity, and data access request satisfaction thresholds.

Modeled activity can be previously serviced data access requests over time and/or computer generated hypothetical system servicing of data access requests. Current activity can involve the location, duration, and latency of actual data access requests that have been serviced as well as the number and size of pending data access requests to the data storage system.

By inputting such diverse system information along with modeled performance information, the buffer manager 152 will have an accurate understanding of the current status of the data storage system and can intelligently respond to a pending data write request with a buffer destination that optimizes system performance. That is, the buffer manager 152 can utilize the algorithm 156 and log 158 of past servicing of data access requests to generate a buffer tenure value for a pending data write request. For instance, the buffer manager 152 can identify that a pending write request will have a tenure value greater than a predetermined threshold, which corresponds to the write requests likely remaining in a buffer for too long.

The ability to generate a buffer tenure value with the buffer manager 152 is complemented by the ability to adapt the buffer location of data based on changing system conditions. As a non-limiting example, a buffer tenure value may initially be below a threshold, but the data remains in a buffer for too long, as identified by the timer 154, which triggers the buffer manager 152 to move and replace the data in the fast data buffer. Hence, the buffer manager 152 can provide proactive and reactive evaluations of a data storage system that allows continuous, and potentially varying, decisions and actions regarding data of a data write request.

Figure 5:
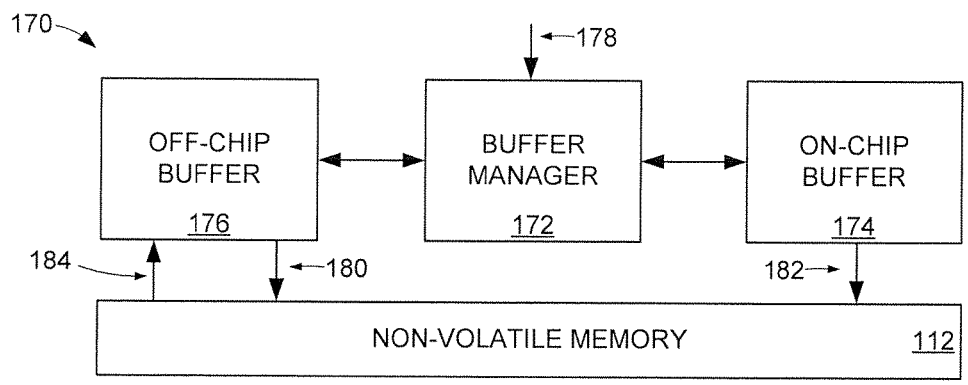
FIG. 5 illustrates a portion of an example data storage device employed in the data storage system of FIG. 3.

FIG. 5 conveys a block representation of a portion of an example data storage system 170 where a buffer manager 172 may direct data read operations. It is noted that while different reference numbers are used for a buffer manager, the buffer manager 172 may have any, all, or none of the characteristics and capabilities of the managers 144/152 discussed in FIGS. 3-4. The buffer manager 172 can be connected to one or more on-chip buffers 174, such as SRAM, and one or more off-chip buffers 176, such as double data rate (DDR) DRAM.

An incoming data write request 178 can be evaluated by the buffer manager 172, which subsequently generates a buffer tenure value that corresponds with a buffer destination. The data of a write request can be written to the non-volatile memory 112 from the off-chip buffer 176, as represented by arrow 180, or from the on-chip buffer 174, as represented by arrow 182. While a single write operation can be sufficient to move all the data of the write request into the memory 112, it is contemplated that the non-volatile memory 112 comprises multi-level cells, such as triple (TLC) or quad (QLC) cells, that require multiple separate write operations to completely transfer data. The writing of multi-level cells may involve readback data that is directed by the buffer manager 172 to slower off-chip buffer 176 instead of an on-chip buffer 174 so that the on-chip buffer can receive and service new write request data.

The buffer manager 172 can proactively, or reactively, evaluate readback data from the non-volatile memory 112 that occurs for any reason to direct the readback data to the buffer that best services the data without degrading system performance. As such, the buffer manager 172 may generate a buffer tenure value for actual, or predicted readback data arising from executing a write access request.

Figure 6A:
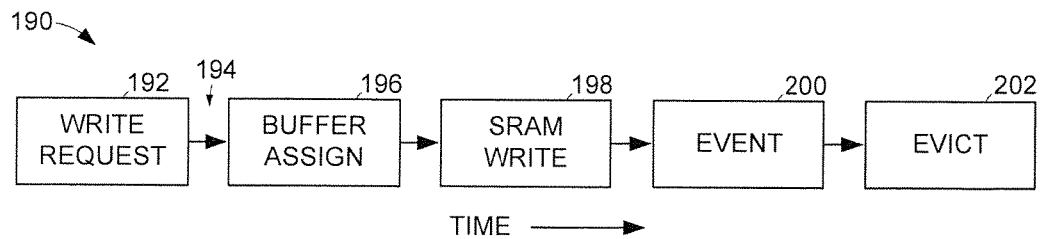
FIGS. 6A-6C respectively show different block representations of an example data storage device operated in accordance with assorted embodiments.
Figure 6B:
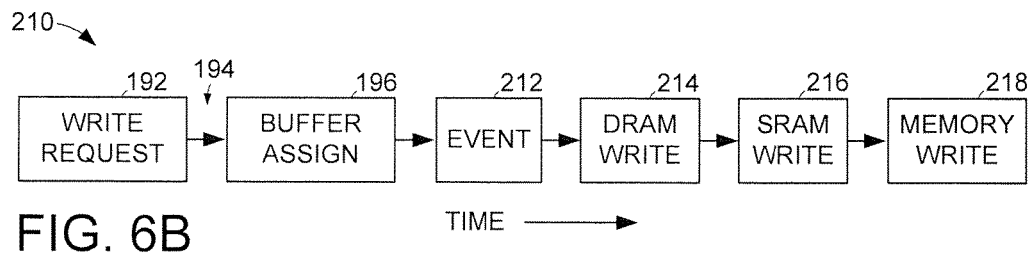
Figure 6C:
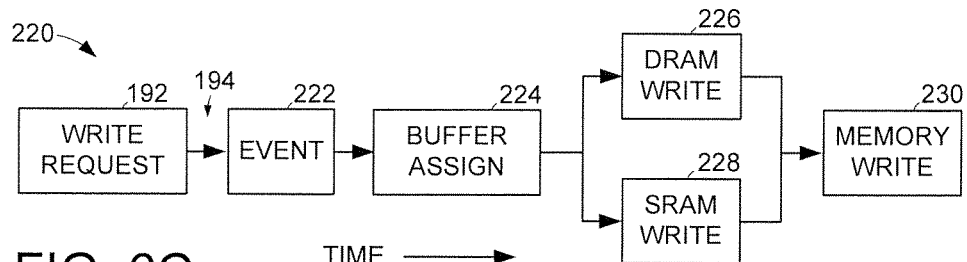

FIGS. 6A-6C respectively depict block representations of non-limiting operations conducted over time by a data storage device as part of a distributed network data storage system. FIG. 6A shows sequence 190 where a write access request is received by a buffer manager in step 192. The buffer manager processes the request at time 194 and generates an actual, and/or predictive, buffer tenure value that corresponds with a buffer assigned in step 196.

In the event that the buffer tenure value is less than a performance threshold, such as 1 minute, 10 microseconds, or 10 nanoseconds, step 198 proceeds to write the data of the write request into an on-chip SRAM buffer. It is contemplated that the writing of data to the buffer in step 198 immediately schedules the writing of the data to a non-volatile memory of the data storage device. However, the occurrence of an event in step 200 may trigger the buffer manager to evict the data in step 202 to a slower off-chip buffer. The event of step 200 is not limited to a particular instance, but can be changing system parameters, receipt of other, more prioritized, write requests, or slower than expected non-volatile memory performance.

Sequence 210 of FIG. 6B shows how an event 212 can occur after a buffer assignment of step 196 and before data is written to a buffer. The event 212 can alter the buffer tenure value or otherwise cause the buffer manager to send data of the data request to the off-chip DRAM in step 214. The data may be resident in the off-chip buffer for any amount of time before the buffer manager prompts the data to be moved to the SRAM on-chip buffer in step 216. The triggering of data movement from DRAM to SRAM may be considered a second event that can be similar, or dissimilar to event 212.

Storage of the write request data in the on-chip buffer allows step 218 to write to quickly write the data to non-volatile memory. Thus, the buffer manager adapts to multiple events and optimally writes data to the non-volatile memory from on-chip SRAM instead of from off-chip DRAM. The capability of the buffer manager to store some, or all, of pending write data to off-chip buffers allows a data storage system to maintain the on-chip buffer full of pending write data, which corresponds with the fastest write request satisfaction possible with a data storage device employing solid-state non-volatile memory such as NAND flash.

FIG. 6C shows sequence 220 where one or more events 222 occur before, or during, buffer assignment from the buffer manager. The event(s) 222 can trigger the buffer manager to alter a previously generate buffer tenure value and/or buffer assignment to an assignment of step 224 that designates writing write data to both the off-chip DRAM at step 226 and the on-chip SRAM at step 228. The buffer manager may divide the write data into sub-sectors that are split between the buffers in steps 226 and 228. In some embodiments, the write data is mirrored, or striped, to both buffers in steps 226 and 228, which allows eviction from SRAM more efficient than having to retain data in SRAM until the data is successfully written to DRAM during an eviction, such as in step 202.

The presence of data in one, or both, buffers allows the efficient writing of data to the non-volatile memory in step 230. With the various, non-limiting embodiments of FIGS. 6A-6C, the adaptive capabilities of a buffer manager are generally illustrated. However, the embodiments of sequences 190, 210, and 220 are not exhaustive and the buffer manager can adapt to one or more encountered events in any manner to optimize data write bandwidth to the non-volatile memory of a data storage device. As a result, high volumes of data write requests can be handled in intelligently, and perhaps differently, by separate data storage devices of a distributed data storage system network.

Through the assorted embodiments of the buffer manager, dynamic events can be recognized and efficiently handled without degrading system performance. For instance, a dynamic event may be an error that creates a data path blockage and/or bottleneck. Another non-limiting instance can involve an addressing conflict that can degrade the servicing of data access requests without the buffer manager moving or re-routing data to various connected memories. One motivation for the case of dynamic re-routing of data blocked by an error to a long tenure memory is to preserve the ability of the short (fast-path) tenure memory to service data that is not blocked, such as data for another host interface port or another virtual storage device.

In the event addressing conflicts arise, such as during garbage collection operations map units are read that span flash pages, the algorithm 156 might not be able to deallocate a first flash page that has been read into memory until the full map unit is available to transfer out of the memory. If a flash die conflict, such as the die being busy with a garbage collection write or erase operation to another page on the die, temporarily delays the second half of the map unit from being read, then the full map unit and the associated first page would be left allocated in the first memory for a long time, reducing the amount of memory available to achieve a given throughput for garbage collection and/or host operations. If the flash scheduling occurs up-front, the conflict can be detected before the first page is written into the memory and the data can be directed to the longer tenure memory by the buffer manager, which keeps the short tenure memory available for other operations.

Figure 7:
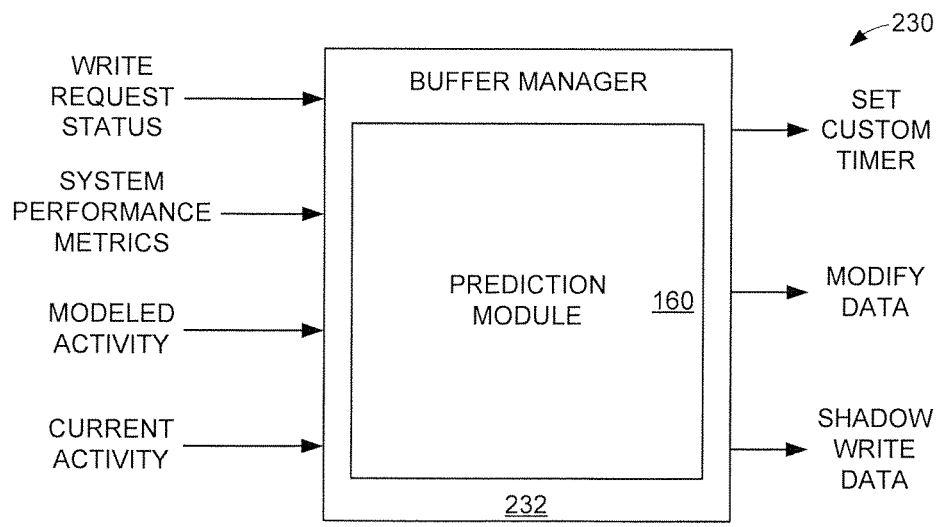
FIG. 7 represents a portion of an example data storage device utilized in the data storage system of FIG. 3.
Figure 8:
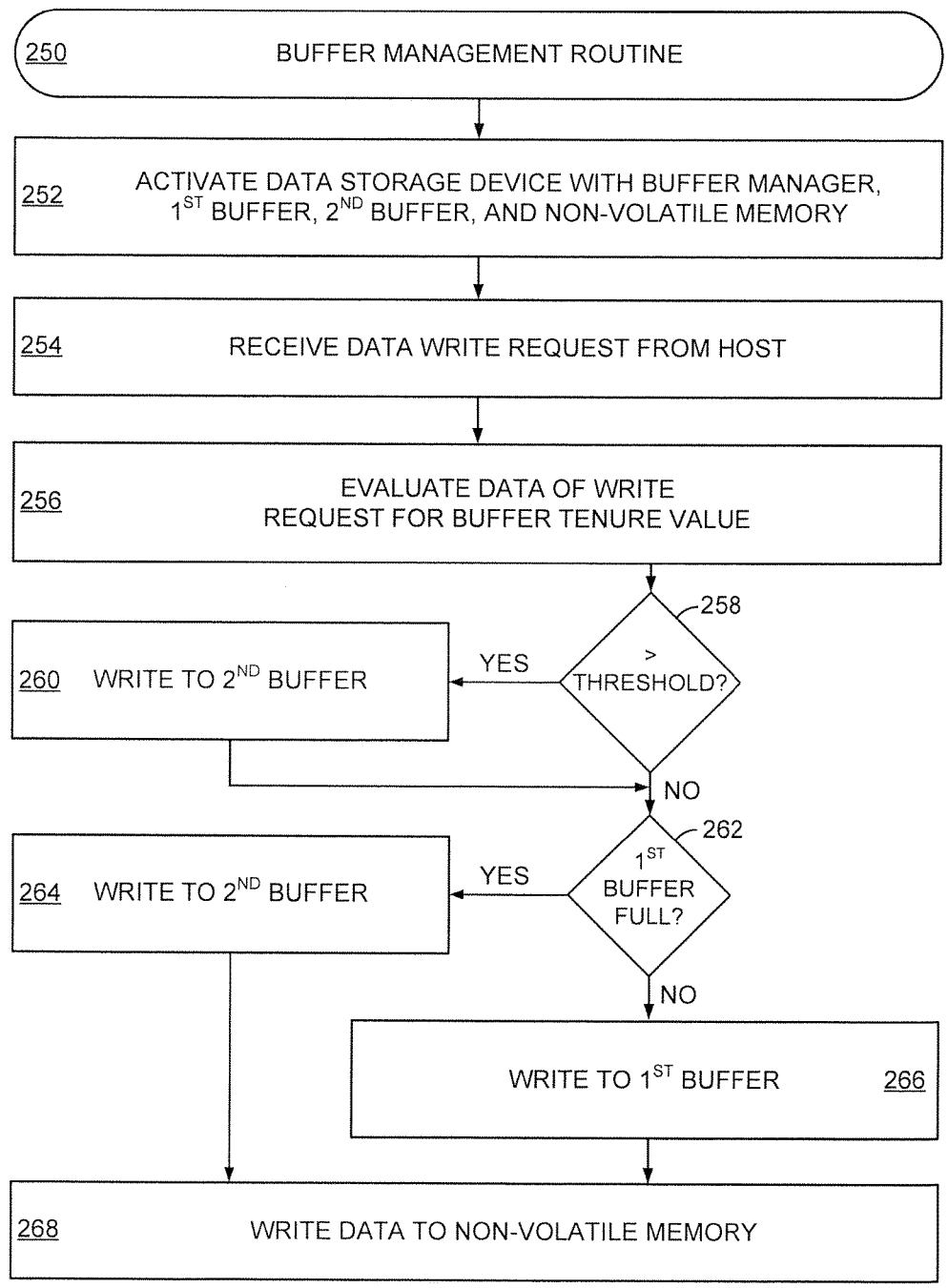
FIG. 8 provides a flowchart for an example buffer tenure management routine performed in accordance with various embodiments.

Part of the intelligence of a buffer manager is the ability to predict assorted characteristics associated with a pending write request. FIG. 7 represents a portion of an example data storage device where predictive operations can be carried out. As shown, a buffer manager 232 has at least a prediction module 160 that can receive pending write request status, system performance metrics, modeled system activity, and current system activity to forecast one or more parameters associated with servicing the write request.

The prediction module 160 may act alone, or with other aspects of the buffer manager, such as the log 158 or algorithm 156, to generate a hypothetical request servicing scenario that involve servicing parameters like duration, latency, error rate, and power consumption. The prediction module 160 can concurrently, or sequentially, generate more than one request servicing scenario with varying risk profiles. That is, the prediction module 160 may assess a generated request servicing scenario for accuracy and risk of coming true. Such assessment of risk allows the module 160 to select the scenario with the highest accuracy and risk of coming true, which may correspond with accuracy being above a predetermined threshold, such as 90%.

Regardless of how the prediction module 160 arrives at the servicing parameters of a forecasted request servicing scenario, the buffer manager 232 can react by altering predefined firmware instructions for handling a write request. For instance, the buffer manager 232 can set a custom timer range for data, modify the data of the write request, and/or shadow write data to multiple different buffers. It is noted that the output reactions of the buffer manager 232 in FIG. 7 are not limiting or exhaustive and the buffer manager 232 can perform any alteration to the handling of a data write request to optimize system performance during the servicing of one or more data write requests, such as maintaining a write request latency of less than 10 nanoseconds or 10 microseconds.

FIG. 9 is a flowchart of the execution of a buffer management routine 250 practiced in the assorted embodiments of FIGS. 1-8. The routine 250 begins with step 252 activating one or more data storage devices as part of a data storage system distributed network. Each data storage device can consist of a buffer manager connected to an on-chip first buffer and an off-chip second buffer along with a non-volatile memory within a common device housing. It is contemplated that each data storage device of the system is accessible by one or more remote hosts.

In step 254, one or more data write requests are received from at least one host. Before being written to a buffer or non-volatile memory, step 256 evaluates the data of the pending write request to generate a buffer tenure value. The data, in some embodiments, is written to cache memory resident in a network controller, or the data storage device itself while step 256 processes the write request to provide a buffer tenure value and a buffer destination.

The generated buffer tenure value is then evaluated by the buffer manager against a threshold generated by the buffer manager in view of the current data storage system performance. That is, the buffer manager can continuously, or sporadically, assess the performance of a data storage device and/or system to generate a threshold for buffer tenure values that corresponds with optimal data write request servicing. Decision 258 compares buffer tenure value from step 256 to the tenure threshold. If the tenure value is greater than the threshold, meaning the data of the write request will reside in a buffer for longer than the threshold allotted time, routine 250 advances to step 260 where the data of the data write request is written to the off-chip second buffer.

At the conclusion of step 260, or if a buffer tenure value is below the threshold of decision 258, decision 262 proceeds to evaluate if the on-chip first buffer is full of data awaiting to be written to non-volatile memory. If so, data is written to the off-chip second buffer. In the event the first buffer is not full, step 266 writes the data to the on-chip first buffer. The determination of whether the on-chip first buffer is full of data in decision 262 ensures that the faster first buffer is full before writing data to the slower off-chip second buffer.

Data resident in either the first or second buffers from steps 264 or 266 allows the buffer manager to efficiently schedule the writing of data to the non-volatile memory of the data storage device in step 268. The ability to conveniently schedule the writing of data to the non-volatile memory from the respective buffers instead of having to write data allows the buffer manager to optimize the bandwidth of data write requests that maintains a full SRAM on-chip buffer.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a data storage device having a first buffer, a second buffer, a buffer manager, and a non-volatile memory, the first buffer and a local controller each constructed of a silicon material of a single wafer chip, the second buffer positioned external to and interconnected to the single wafer chip, the first buffer filled with data having a predicted tenure of less than a predetermined tenure threshold as directed by the buffer manager, the predicted tenure generated by a prediction module of the buffer manager, the predicted tenure corresponding with an amount of time data associated with a write request is forecasted to remain in the first buffer, the tenure threshold is generated based on an algorithm, current data storage device activity, data storage device past performance, and pending write request volume.

2. The apparatus of claim 1, wherein the first buffer is static random access memory.

3. The apparatus of claim 1, wherein the second buffer is dynamic random access memory.

4. The apparatus of claim 1, wherein the non-volatile memory is NAND flash.

5. The apparatus of claim 1, wherein the second buffer is positioned within a housing of the data storage device.

6. A method comprising:
   activating a data storage device, the data storage device having a first buffer, a second buffer, a buffer manager, and a non-volatile memory;
   generating a tenure threshold with the buffer manager, the tenure threshold is generated based on an algorithm, current data storage device activity, data storage device past performance, and pending write request volume;
   evicting a first data sector from the first buffer with the buffer manager in response to the first data sector exceeding the tenure threshold; and
   storing a second data sector in the first buffer as directed by the buffer manager to fill the first buffer with data having a tenure of less than the tenure threshold.

7. The method of claim 6, wherein the tenure threshold matches a latency speed of the second buffer.

8. The method of claim 6, wherein the buffer manager evicts the first data sector to the second buffer.

9. The method of claim 6, wherein the second data sector subsequently is written to the non-volatile memory.

10. The method of claim 6, wherein the buffer manager stores readback data from the non-volatile memory in the second buffer without the readback data being stored in the first buffer.

11. The method of claim 6, wherein the buffer manager reacts to a dynamic event by re-routing the second data sector from the first buffer to the second buffer.

12. The method of claim 11, wherein the dynamic event is a data error corresponding with a reduction in data storage device performance.

13. The method of claim 11, wherein the dynamic event is an addressing conflict corresponding with a reduction in data storage device performance.

14. A method comprising:
   activating a data storage device, the data storage device having a first buffer, a second buffer, a buffer manager, and a non-volatile memory;
   generating a tenure threshold with the buffer manager;
   predicting a tenure of a first data sector with a prediction module of the buffer manager, the predicted tenure generated based on an algorithm, current data storage device activity, data storage device past performance, and pending write request volume to correspond with an amount of time data associated with a write request is forecasted to remain in the first buffer;
   storing the first data sector in the second buffer in response to the predicted tenure being greater than the tenure threshold;
   predicting a tenure of a second data sector with the buffer manager;

evicting a third data sector from the first buffer with the buffer manager in response to the third data sector exceeding the tenure threshold; and storing the second data sector in the first buffer as directed by the buffer manager to fill the first buffer with data having a tenure of less than the tenure threshold.

15. The method of claim 14, wherein the buffer manager sets a custom timer in response to a prediction module evaluating the second data sector.

16. The method of claim 15, wherein the custom timer is different than the tenure threshold.

17. The method of claim 14, wherein the buffer manager alters the second data sector in response to the predicted tenure of the second data sector.

18. The method of claim 17, wherein the buffer manager splits the second data sector into first and second sub-sectors, the first sub-sector stored in the first buffer, the second sub-sector stored in the second buffer.

19. The method of claim 14, wherein the buffer manager predicts at least one data storage device performance metric during each predicting step.

* * * * *